Patented Aug. 24, 1943

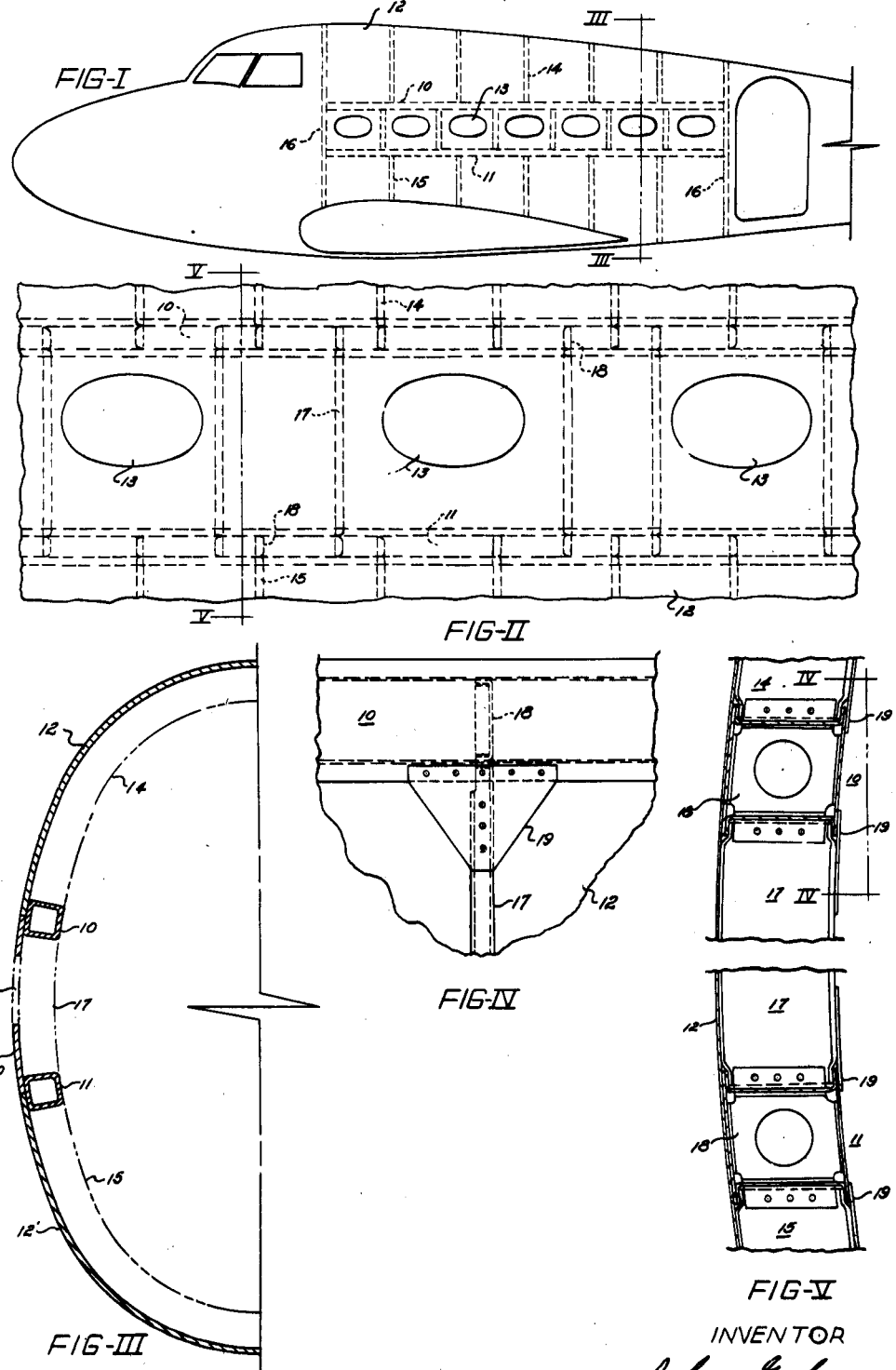

2,327,636

UNITED STATES PATENT OFFICE 2,327,636

AIRCRAFT FUSELAGE CONSTRUCTION

John Gerber, Burbank, Calif., assignor to Lockheed Aircraft Corporation, Burbank, Calif.

Application February 20, 1940, Serial No. 319,848

1 Claim. (Cl. 244—120)

This invention relates to aircraft construction and more particularly to a modified monocoque or semi-monocoque construction for the fuselages or bodies of such craft.

In the design of aircraft fuselages, and particularly the fuselages of large cabin or transport aircraft, it is general practice to provide several cabin arrangements other than that normally considered as standard. These provisions require such a wide variety of seat and window locations that it is frequently necessary to resort to a major redesign of the cabin portion of the fuselage structure. With the conventional monocoque or semi-monocoque type of construction the windows are placed intermediate the transverse frame members and any re-location of same results in an inefficient structure.

It is, therefore, among the objects of this invention to provide a fuselage construction which allows a wide variety of window locations without substantial change in the structure thereof; to provide a construction wherein the transverse frames can be spaced to give the most economical combination with skin and stringers, thus permitting stress requirements alone to determine the most desirable spacings; to improve aircraft structures generally; and many other objects and advantages as will become more apparent as the description proceeds.

In the drawing forming a part of this description:

Figure I is a side elevation of an aircraft fuselage showing the essential internal framework in dotted outline.

Figure II is an enlarged side elevation taken in the region of the window cut-outs and illustrating my preferred construction when the window spacing is greater than indicated in Figure I.

Figure III is an enlarged sectional view as indicated by the line III—III of Figure I.

Figure IV is a view as indicated by the line IV—IV of Figure V and showing the details of the attachment of the frame segments to the longitudinal members.

Figure V is an enlarged sectional view as indicated by the line V—V of Figure II.

Referring to the drawing, my invention consists primarily in the provision of an internal framework for a monocoque or semi-monocoque aircraft fuselage wherein the side walls are to be provided with a plurality of longitudinally disposed openings such as a row of windows. The arrangement consists of upper and lower longitudinal members 10 and 11, respectively, secured to the external skin 12 above and below the windows or openings 13. In the region of these openings 13, upper and lower transverse contour forming members or bulkhead frames 14 and 15, terminating at and secured to said longitudinal members 10 and 11, replace the conventional bulkhead frames 16. Vertical members or frame segments 17, disposed intermediate the openings 13, also terminating at and secured to said longitudinal members 10 and 11, complete the essential elements of the internal framework. It will be understood that the external skin 12 is secured to all of the above mentioned members to form a substantially rigid structure. It will also be understood that other elements such as longitudinal stringers and the like, as are generally known and used in monocoque and semi-monocoque structures, can be combined with the above described construction without departing from the spirit of my invention, and that same have been eliminated from the drawing for the sake of simplicity.

As indicated in Figures II, III, IV and V, the longitudinal members 10 and 11 are preferably box-like in section, in that, the ability of these members to resist torsional stresses adds considerable rigidity to the fuselage structure. When a built-up sheet metal construction as shown in Figures IV and V is employed, it is highly desirable to insert diaphragms 18 within the longitudinal members 10 and 11 at the intersections of same with the transverse members 14 and 15 or vertical members 17. A further, and incidental, advantage obtained by the above described construction is that the longitudinal members may be employed as conduits for electrical wiring and the like. It is also desirable to provide gussets 19 at the above-mentioned intersections to assist in the distribution of stresses.

In the practice of this invention, it is believed advantageous to construct the fuselage, in the region of the openings 13, in two parts; i. e., an upper part comprising longitudinal members 10, transverse members 14 and external skin 12, and a lower part comprising longitudinal members 11, transverse members 15 and external skin 12'. The two parts can then be assembled by means of the vertical members 17 and the sheets of external skin 20 containing the desired openings 13, as indicated in Figure III.

The structure herein shown and described is only one of the many embodiments of my invention and I, therefore, desire to emphasize the fact that modifications may be made therein in a manner limited only by a just interpretation of the appended claim.

I claim:

An aircraft fuselage comprising a front portion, a rear portion and a spaced pair of upper and lower intermediate portions connected to the front and rear portions, a continuous circular transverse bulkhead frame member secured to the marginal edge of each front and rear portion adjacent the respective edge of the intermediate portions and forming reinforcing elements associated with each front and rear portion and the contiguous ends of the intermediate portions, a continuous longitudinal member secured to each lower edge of each upper portion and each upper edge of each lower portion and connected at each end to a respective transverse circular member, a series of spaced intermediate members interconnecting adjacent pairs of longitudinal members, an outer skin covering all of said members, said outer skin having a series of window receiving openings formed therein between adjacent pairs of intermediate transverse members.

JOHN GERBER.